United States Patent
Knebel et al.

(10) Patent No.: US 10,880,028 B2
(45) Date of Patent: Dec. 29, 2020

(54) SYSTEM AND METHOD FOR CLOCK-SKEW-BASED COVERT COMMUNICATION

(71) Applicant: THE UNITED STATES OF AMERICA, AS REPRESENTED BY THE SECRETARY OF THE NAVY, Arlington, VA (US)

(72) Inventors: Erik Sean Knebel, Washington, DC (US); Murali Tummala, Monterey, CA (US); John C. McEachen, Carmel, CA (US)

(73) Assignee: The United States of America, as represented by the Secretary of the Navy, Arlington, VA (US)

(*) Notice: Subject to any disclaimer, the term of this patent is extended or adjusted under 35 U.S.C. 154(b) by 0 days.

(21) Appl. No.: 16/676,599

(22) Filed: Nov. 7, 2019

(65) Prior Publication Data

US 2020/0153528 A1 May 14, 2020

Related U.S. Application Data

(60) Provisional application No. 62/760,370, filed on Nov. 13, 2018.

(51) Int. Cl.
*H04J 3/06* (2006.01)
*H04L 29/06* (2006.01)
(Continued)

(52) U.S. Cl.
CPC ........ *H04J 3/0667* (2013.01); *H04L 43/0858* (2013.01); *H04L 43/106* (2013.01);
(Continued)

(58) Field of Classification Search
CPC .......... H04J 3/06; H04J 3/0602; H04J 3/0605; H04J 3/0638; H04J 3/0647; H04J 3/065;
(Continued)

(56) References Cited

U.S. PATENT DOCUMENTS

| | | | |
|---|---|---|---|
| 6,473,030 B1* | 10/2002 | McBurney | G01C 21/206 342/357.43 |
| 7,403,542 B1* | 7/2008 | Thompson | H04L 69/16 370/389 |

(Continued)

OTHER PUBLICATIONS

Kohno, T., A. Broido, KC Claffy. "Remote Physical Device Fingerprinting." IEEE Transactions on Dependable and Secure Computing, vol. 2, No. 2, Apr.-Jun. 2005, pp. 93-108.

(Continued)

*Primary Examiner* — Kevin D Mew
(74) *Attorney, Agent, or Firm* — Naval Postgraduate School; Lisa A. Norris

(57) ABSTRACT

A system and method for clock-skew-based covert communication in which a message formed of message bits is mapped to corresponding symbols having predetermined clock skew values. For each corresponding symbol, an offset value is calculated and added to each timestamp in a predetermined quantity of outgoing TCP segments to generated altered TCP segments, such that an artificial clock skew is induced as measured by a receiver. A clock skew value is determined from each predetermined quantity of TCP segments and mapped to corresponding symbol. The symbols are then mapped to corresponding message bits, and the message is determined from the bits. In this way a message can be sent from a transmitter to a receiver in a way that is covert during transmission and deciphered at the receiver.

4 Claims, 9 Drawing Sheets

(51) Int. Cl.
*H04L 12/26* (2006.01)
*H04L 12/801* (2013.01)

(52) U.S. Cl.
CPC .......... *H04L 47/193* (2013.01); *H04L 69/163* (2013.01); *H04L 69/166* (2013.01)

(58) Field of Classification Search
CPC ...... H04J 3/0652; H04J 3/0655; H04J 3/0658; H04J 3/0661; H04J 3/0667; H04L 43/0858; H04L 43/106; H04L 47/193; H04L 69/163; H04L 69/166
See application file for complete search history.

(56) References Cited

U.S. PATENT DOCUMENTS

| | | | |
|---|---|---|---|
| 7,725,595 | B1 | 5/2010 | Geissler et al. |
| 9,501,093 | B2 | 11/2016 | Rojas-Cessa et al. |
| 9,596,238 | B2 | 3/2017 | Mansour et al. |
| 10,050,731 | B1 * | 8/2018 | Martin .................... H04L 69/28 |
| 2001/0050903 | A1 * | 12/2001 | Vanlint .................. H04L 41/22 370/252 |
| 2004/0062267 | A1 * | 4/2004 | Minami ................. H04L 47/10 370/463 |
| 2007/0008884 | A1 * | 1/2007 | Tang ..................... H04L 47/283 370/230 |
| 2008/0037420 | A1 * | 2/2008 | Tang ..................... H04L 1/1607 370/229 |
| 2016/0043865 | A1 * | 2/2016 | Matsakis ................ H04L 63/12 713/168 |
| 2019/0238663 | A1 * | 8/2019 | A ........................... H04L 43/16 |
| 2020/0344330 | A1 * | 10/2020 | Yishay ............... H04L 61/2571 |

OTHER PUBLICATIONS

McDanel, Bret. "TCP Timestamping—Obtaining System Uptime Remotely." Downloaded from https://seclists.org/bugtraq/2001/Mar/182 on Sep. 26, 2019, 6 pp.

Knebel, Erik S. "A Novel Approach for Covert Communication Over TCP Via Induced Clock Skew." Thesis, Naval Postgraduate School, 119 pp.

* cited by examiner

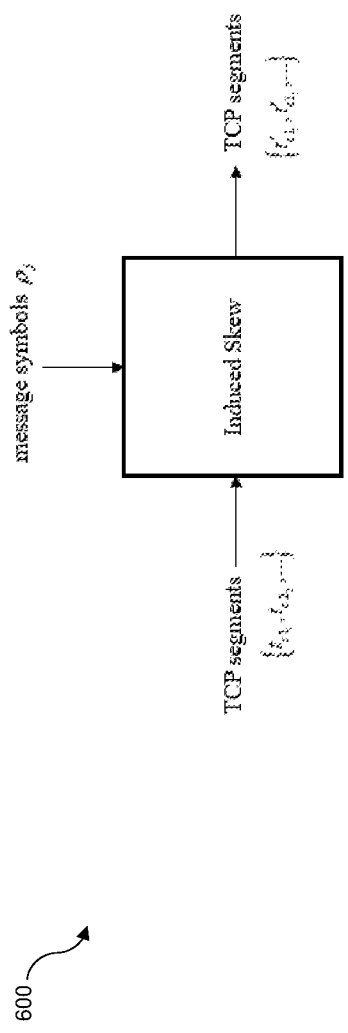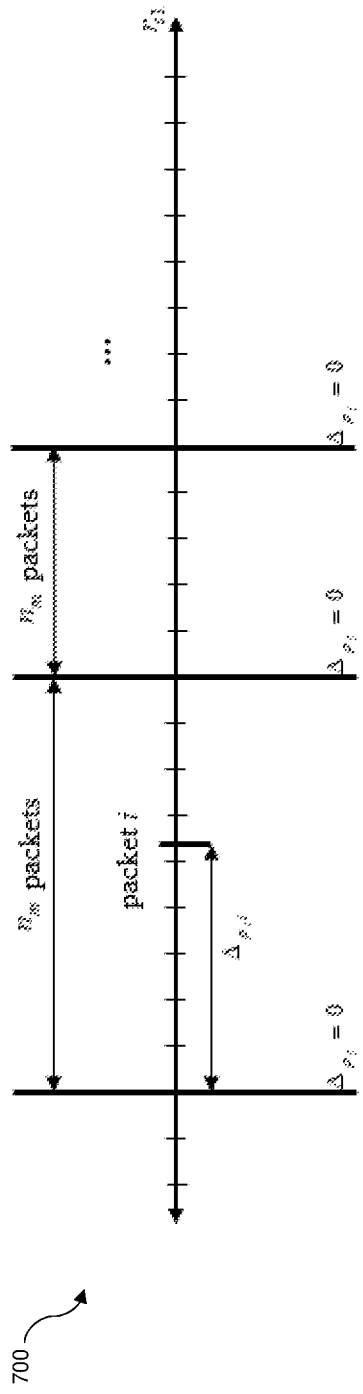

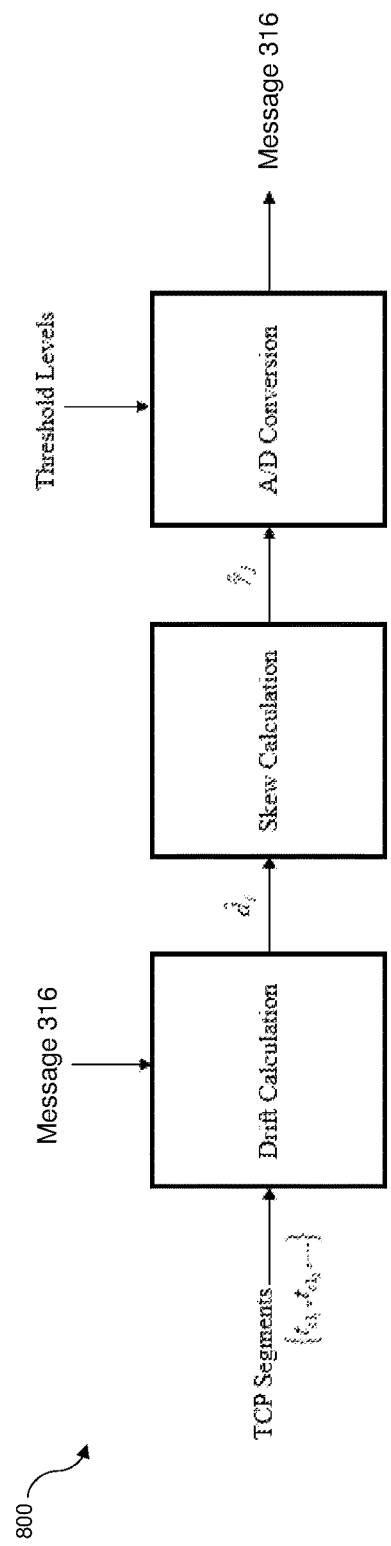

SYSTEM AND METHOD FOR CLOCK-SKEW-BASED COVERT COMMUNICATION

CROSS-REFERENCE TO RELATED APPLICATIONS

This application claims the benefit of U.S. Provisional Application No. 62/760,370 filed Nov. 13, 2018, which is hereby incorporated in its entirety by reference.

BACKGROUND OF THE INVENTION

1. Field of the Invention

The present invention relates generally to the Transmission Control Protocol (TCP), and utilization of the optional timestamp field in the header to include covert communications.

2. Description of the Related Art

Covert channels have use in transmitting various types of information; for example, conveying information related to a transmission signal, e.g., metadata or network diagnostics, and in conveying information which circumvents detection. The Transmission Control Protocol (TCP) is a widely used transport layer protocol. As a result some TCP-based covert channel schemes have been developed in the prior art. Most of these covert channel schemes have been subsequently analyzed, leading to the development of countermeasures capable of detecting or destroying the covert channel.

SUMMARY OF THE INVENTION

Embodiments in accordance with the invention include a system and method in which an induced clock skew in a timestamp of a TCP header is used to provide covert communications.

In accordance with one embodiment, a system for clock-skew-based covert communication utilizing the TCP including: a transmitter, the transmitter including: a central processing unit (CPU) having a CPU clock which generates a timestamp for outgoing TCP segments, and an embedding module; a receiver, the receiver including: a central processing unit (CPU) having a CPU clock which generates a timestamp for incoming TCP segments, and an extractor module; and a network communicatively coupling the transmitter and the receiver; wherein the embedding module: obtains a message to be sent, the message including message bits; maps the message bits to a corresponding symbol, the symbol having an associated clock skew value; calculates an offset value to be added to each timestamp in a predetermined quantity of TCP segments to result in the associated clock skew value for the symbol; adds the calculated offset value to each timestamp in the predetermined quantity of TCP segments to generate a predetermined quantity of altered TCP segments; and transmits the predetermined quantity of altered TCP segments to the network; and, wherein the extractor module: receives the predetermined quantity of altered TCP segments; determines the clock skew value from the timestamps of the predetermined quantity of altered TCP segments; determines the symbol that corresponds to the clock skew value based on predetermined threshold levels; extracts the symbol through analog to digital conversion (A/D); maps the symbol to the corresponding message bits; and, obtains the message from the message bits.

In accordance with another embodiment, a method for clock-skew-based covert communication utilizing the TCP includes: establishing a TCP session between a transmitter and a receiver over a communication network; establishing a baseline clock skew of the transmitter by the receiver; obtaining a message to be sent by the transmitter, the message including message bits; mapping the message bits to a corresponding symbol, the symbol having an associated clock skew value; calculating an offset value to be added to each timestamp in a predetermined quantity of TCP segments to result in the associated clock skew value for the symbol; adding the calculated offset value to each timestamp in the predetermined quantity of TCP segments to generate a predetermined quantity of altered TCP segments; transmitting the predetermined quantity of altered TCP segments over the communication network to the receiver; receiving the predetermined quantity of altered TCP segments at the receiver; determining the associated clock skew value from the timestamps of the predetermined quantity of altered TCP segments; determining the corresponding symbol for the clock skew based on predetermined threshold levels; extracting the symbol through analog to digital conversion (A/D); mapping the symbol to corresponding message bits; and, obtaining the message from the message bits.

Further embodiments include a method for embedding a clock-skew-based covert communication at a transmitter utilizing the TCP and a method for extracting a clock-skew-based covert communication at a receiver utilizing the TCP.

Embodiments in accordance with the invention are best understood by reference to the following detailed description when read in conjunction with the accompanying drawings.

BRIEF DESCRIPTION OF THE DRAWINGS

FIG. 6 illustrates a functional diagram of message embedding in accordance with one embodiment of the invention.

FIG. 7 illustrates the relationship between $\Delta_{\rho_j}$, $n_m$, and $r_{c1}$ in accordance with one embodiment of the invention.

FIG. 8 illustrates a functional diagram of message extraction in accordance with one embodiment of the invention.

FIG. 10, shown in partial views

Embodiments in accordance with the invention are further described herein with reference to the drawings.

DETAILED DESCRIPTION OF THE INVENTION

Figure 1:
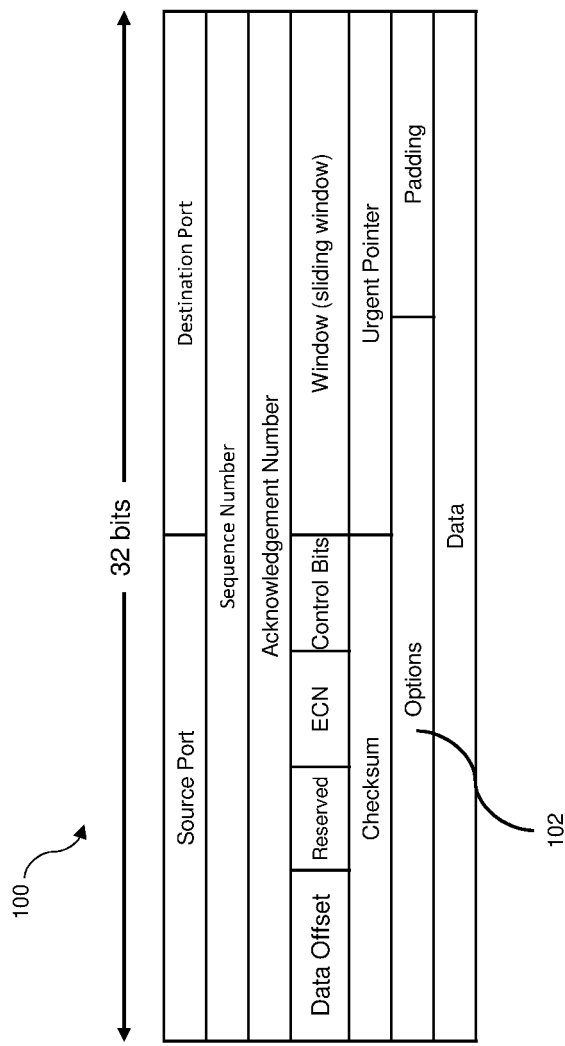
FIG. 1 illustrates an example of a TCP header in the prior art.
Figure 2:
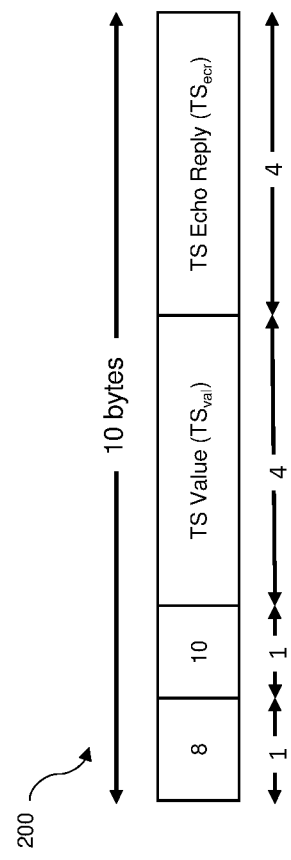
FIG. 2 illustrates an example of a TCP timestamp in the prior art.

Transmission Control Protocol (TCP) is a widely used transport layer protocol and is well known to those of skill in the art. FIG. 1 illustrates an example of a TCP header 100 in the prior art. A TCP timestamp is one of the TCP options available for use in an options field 102. FIG. 2 illustrates an example of a TCP timestamp 200 in the prior art. The TCP timestamp itself is ten bytes long and consists of four fields as shown in FIG. 2. The TCP timestamp is well known to those of skill in the art.

Clock skew is the rate of change of drift between two clocks, such as between two central processing unit (CPU) clocks. Clock skew can be estimated by comparing at least two simultaneously-taken timestamps from each CPU clock. Clock skew is well known to those of skill in the art. Generally, a clock skew between a sending CPU clock and a receiving CPU clock over TCP is relatively constant over time.

Figure 3:
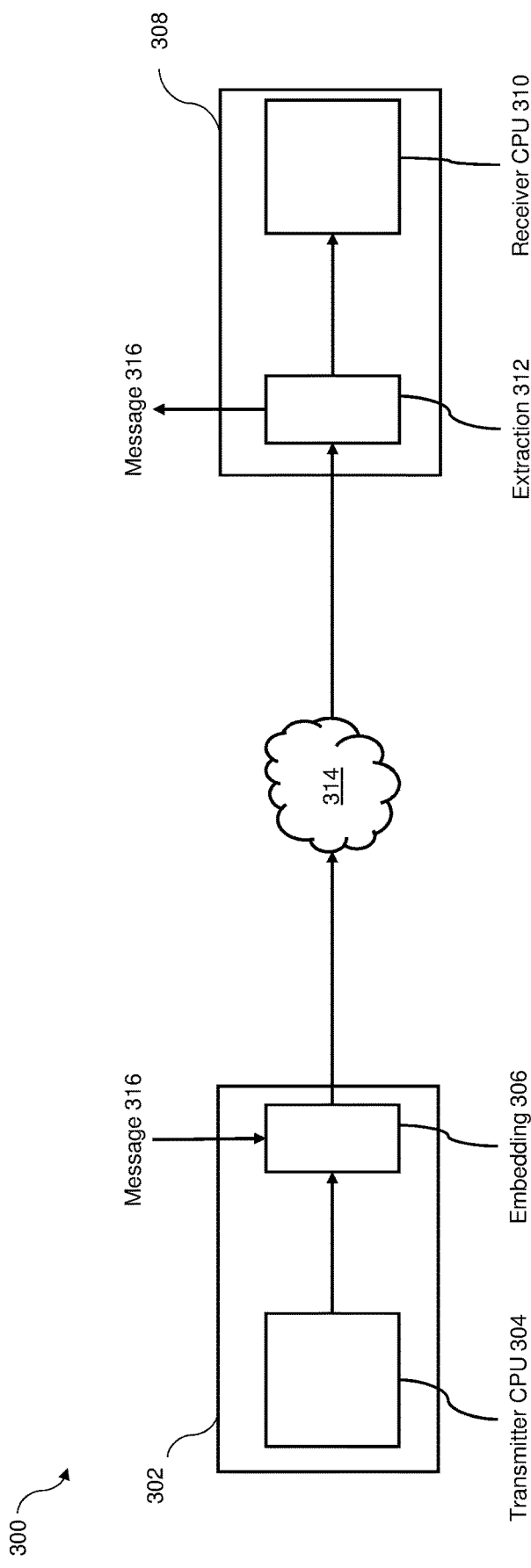
FIG. 3 illustrates an overview diagram of a system for clock-skew-based covert communication in accordance with one embodiment of the invention.

FIG. 3 illustrates an overview diagram of a system 300 for clock-skew-based covert communication in accordance with one embodiment of the invention. In the present embodiment system 300 includes: a sending computer system 302 having a CPU 304 with a CPU clock and a method for embedding a covert message, herein referred to as an embedding module 306; a receiving computer system 308 having a CPU 310 with a CPU clock and a method for extracting an embedded covert message, herein referred to as an extraction module 312; and, a network 314 communicatively coupling sending computer system 302 with receiving computer system 308. Sending computer system 302 is further referred to herein as transmitter 302; and, receiving computer system 308 is further referred to herein as receiver 308. Transmitter 302 and receiver 308 communicate via network 314 utilizing TCP, and can generate and detect timestamps in a TCP header, for example, a timestamp in TCP options field 102 of TCP header 100 (FIG. 1). Network 314 can be any network suitable for communicatively coupling transmitter 302 and receiver 308 utilizing the TCP protocol, such as the Internet.

Transmitter 302 and receiver 308 can further include an operating system; one or more input/output (I/O) interface(s); and a memory. In various embodiments, I/O interface(s) may include device interfaces, as well as network interfaces, that allow communications over networks, such as network 314. Other devices such as display device, input device(s), e.g., a keyboard, a mouse, and a printer, as well as one or more standard input-output (I/O) devices, such as a compact disk (CD) or DVD drive, or other porting device for inputting/outputting data.

In one embodiment, embedding module 306 is loaded into a memory of transmitter 302 as executable code, for example via I/O device, such as from a CD, DVD, or other digital communicable form containing embedding module 306, or via a network download. In one embodiment, extraction module 312 is loaded into a memory of receiver 308 as executable code, for example via I/O device, such as from a CD, DVD, or other digital communicable form containing extraction module 312, or via a network download.

In the present embodiment, embedding module 306 is executed on transmitter 302, and extraction module 312 is executed on receiver 308. In some embodiments, either or both transmitter 302 and receiver 308 may be further coupled to other devices, and embedding module 306 and/or extraction module 312 can be fully or partially implemented on the other devices. Embedding module 306 and extraction module 312 can be embodied as computer program products in a medium configured to store or transport computer readable code. Some examples of computer program products are CD-ROM discs, DVDs, ROM cards, and computer hard drives. A CPU, an operating system, an I/O interface, a memory, a display screen, standard I/O devices and ports, general storage of applications in memory, and general execution of applications by operating system are well known to those of skill in the art. In the present embodiment, a message 316 is input to transmitter 302, for example, via a keyboard device coupled to transmitter 302.

Broadly viewed, transmitter 302 of system 300 maps a message 316, to be sent covertly, to symbols having a predetermined meaning. The symbols are then mapped to predetermined values of clock skew and the induced clock offset necessary to generate this skew is subsequently calculated. The induced clock offset is added to outgoing TCP segments timestamps generated by the CPU clock of transmitter 302. The TCP segments with the induced offset are sent over network 314 and received by receiver 308 of system 300. Receiver 308 determines the induced clock skew from the induced offsets in the received TCP segments and maps the induced clock skew to the corresponding symbols with predetermined meanings and extracts message 316. In this way message 316 can be sent from a sending CPU to a receiving CPU in a way that is covert during transmission and deciphered at the receiving CPU.

Figure 4:
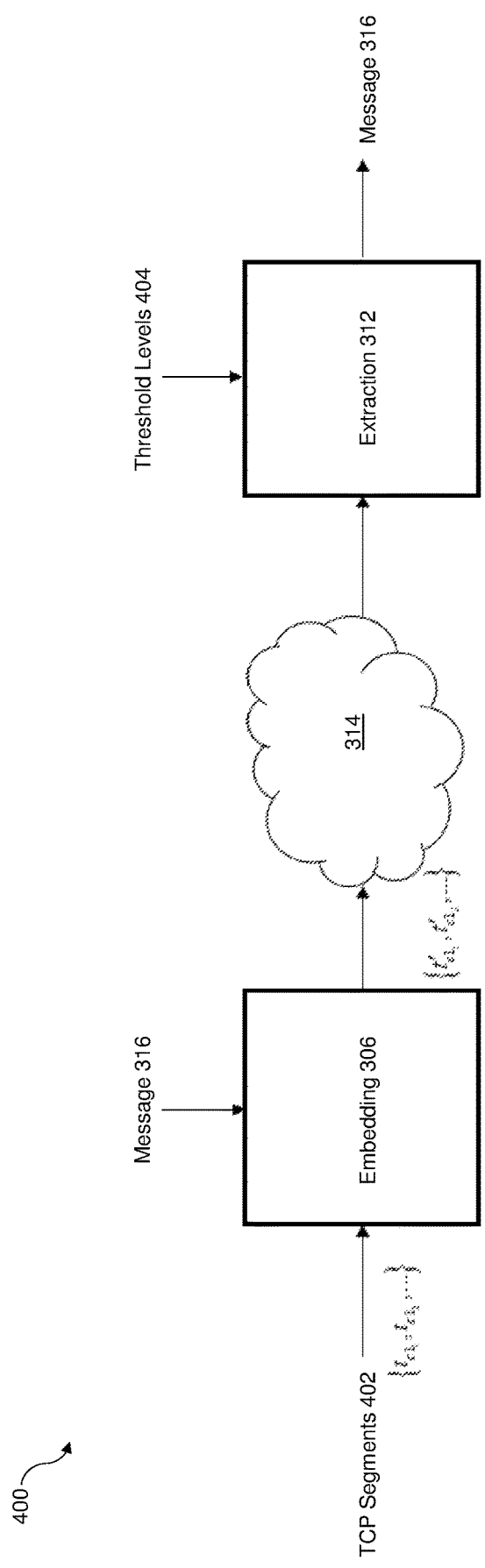
FIG. 4 illustrates a functional diagram of the system of FIG. 3 for clock-skew-based covert communication in accordance with one embodiment of the invention.

FIG. 4 illustrates a high level functional diagram 400 of system 300 in accordance with one embodiment of the invention. Embodiments in accordance with the invention allow two hosts, transmitter 302 and receiver 308, to communicate using induced clock skew over a TCP connection. A TCP timestamp provides the transmitter 302 timestamp $t_{c1}$, and a packet-sniffing application at the receiver provides the receiver 308 timestamp $t_{c2}$. As further described herein, utilizing these two values from each of a predetermined number of TCP segments timestamps, the clock skew can be calculated at receiver 308 Referring to FIGS. 3 and 4, together, covert message 316 is embedded in TCP segments 402 at embedding module 306 of transmitter 302 and transmitted over network 314 to receiver 308. In FIG. 4, the prime marker (') on the timestamps after embedding denotes the alteration of the timestamp. Receiver 308 receives the altered TCP segments, and extraction module 312 extracts message 316 utilizing threshold levels 404 which allow the altered timestamps to be mapped to the original message 316. The embedding and extraction functions are further described with reference to FIG. 5.

Figure 5:
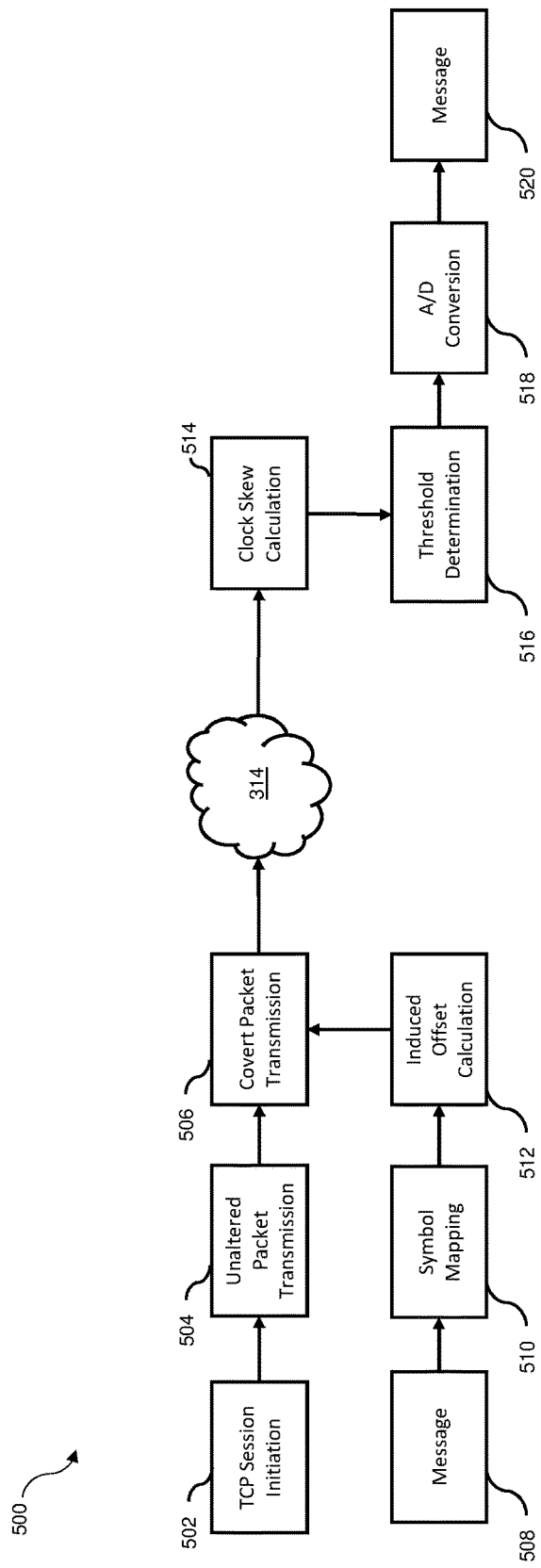
FIG. 5 illustrates a functional diagram of embedding and extraction of a message in accordance with one embodiment of the invention.

FIG. 5 illustrates a functional diagram 500 of embedding and extraction of a message by system 300 in accordance with one embodiment of the invention. In operation 502, transmitter 302 initiates a TCP connection with the timestamp option of the TCP header enabled. In operation 504, transmitter 302 initially transmits a predetermined quantity of unaltered TCP segments to allow receiver 308 the opportunity to calculate the baseline clock skew of transmitter 302.

In operation 508, message 316 is input to embedding module 306, for example via a keyboard coupled to transmitter 302. In operation 510, embedding module 306 converts the message bits forming message 316 to selected symbols having a predetermined meaning. In operation 512, the selected symbols are converted to associated induced offset values. In operation 506, transmitter 302 begins adding the induced offset values to each outgoing timestamp of a TCP segment in a batch of TCP segments of the predetermined quantity to produce a desired clock skew value at receiver 308 and transmits the altered TCP segments over network 314. Receiver 308 receives the TCP segments and reverses the process. In operation 514, extraction module 312 calculates the clock skew for each batch of TCP segments by taking the slope of a least squares linear regression of the offsets. In operation 516, the clock skew value then compared against a threshold value to determine which symbol it is mapped to for A/D conversion. In operation 518, extraction module 312 performs an analog-to-digital (A/D) conversion to convert the clock skew to a message symbol having a predetermined meaning, and, in operation 520, the symbols are mapped to message bits and message 316 is obtained.

Initially, a predetermined quantity of unaltered TCP segments are sent by transmitter 302 to receiver 308. The initial TCP segments are intentionally unaltered to allow transmitter 302 to estimate the baseline skew $\alpha_b$ of receiver 308. The quantity of unaltered TCP segments $n_b$ used to make this calculation add overhead to system 300 because the unaltered TCP segments do not contain any message information. Once transmitter 302 has sent $n_b$ segments, transmitter 302 begins inducing clock skew on outgoing timestamps in batches of $n_m$ segments. Each subsequent batch of $n_m$ segments has an independent induced clock skew $\gamma_j$ that is a product of the base clock skew level $\zeta$ PPM and the value of the symbol $\rho$ being transmitted as given by:

$$\gamma_j = \zeta \rho_j. \tag{1}$$

Transmitter 302 and receiver 308 must share the predetermined values of $n_b$, $n_m$, and $\zeta$ as well as the same symbol set to ensure correct extraction.

of only two symbols. Clock skew is an analog property that can take on any value; thus, theoretically, an infinite number of different clock skews can be induced. The signal-to-noise ratio (SNR) limits the ability to differentiate between clock skews that are close in value and, thus, limits the size of the symbol set. Higher-order implementations, also referred to as q-bit-per-symbol implementations, provide a means for overcoming a low data rate. These higher-order implementations map q bits to $Q=2^q$ distinct symbols. Herein are described examples of message embedding and extraction for q=1, q=2 and q=4. The binary implementation is a special case of the q-bit-per-symbol implementation for q=1.

A symbol mapping for q=1 is given by:

$$\rho_j = \begin{cases} 1, & \text{for } j = 1 \\ -1, & \text{for } j = 0 \end{cases}. \tag{3}$$

To map symbols to bits q>1, a gray code is utilized to increase the likelihood that a single symbol error at receiver 308 only produces a single bit error.

A symbol mapping for q=2 shows an example of the q-bits-per-symbol implementation:

$$\rho_j = \begin{cases} 2, & \text{for } j = 01 \\ 1, & \text{for } j = 00 \\ -1, & \text{for } j = 10 \\ -2, & \text{for } j = 11 \end{cases}. \tag{4}$$

A symbol mapping for q=4, the highest value of q that is described herein, is given by Table 1.

TABLE 1

Symbol mapping for q = 4.

| bits j | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| symbol $p_j$ | -8 | -7 | -5 | -6 | -1 | -2 | -4 | -3 | 8 | 7 | 5 | 6 | 1 | 2 | 4 | 3 |

FIG. 6 illustrates a functional diagram 600 of message embedding in system 300 in accordance with one embodiment of the invention. Message embedding is achieved by inducing clock skew into outgoing batches of TCP segments according to equation (1) and as illustrated in FIG. 6. Individual timestamps of TCP segments are modified to create the desired clock skew for each symbol at embedding module 306. Inducing clock skew into the transmitted TCP segments means that the clock skew being transmitted is a combination of the natural clock skew of transmitter 302 and the clock skew induced at transmitter 302. The total clock skew measured by receiver 308 is then given by:

$$\alpha = \alpha_b + \gamma. \tag{2}$$

Transmitter 302 cannot add clock skew directly to individual outgoing TCP segments because clock skew is calculated over multiple timestamps. To induce the desired clock skew, transmitter 302 must add an offset $\delta_i$ to the timestamp of each TCP segment i to result in the desired induced clock skew.

The first step in determining offset $\delta_i$ is mapping each message bit group j to a corresponding symbol $\rho_j$. A binary implementation, the lowest order implementation, has a set Having determined the desired clock skew $\gamma_j$ based on equation (1), offset $\delta_i$ is determined. The relationship between the induced clock skew and induced offset is given by:

$$\gamma = \frac{d\delta}{dr_{c1}}. \tag{5}$$

Conceptually, offset $\delta_i$ is the antiderivative of $\gamma_j$ at the time each TCP segment is sent, and is given by:

$$\delta = \gamma r_{c1} + \beta_0, \tag{6}$$

where $\beta_o$ is a constant. $\beta_o$ is set to zero because a nonzero value produces an unhelpful and conspicuous jump in offset and drift when clock skew is calculated at receiver 308. By replacing the offset in equation (6) with the bit time $\Delta$, defined herein as the offset since the first TCP segment in the current batch of $n_m$ was transmitted, each $\beta_o$ is zero for each clock skew calculation of $n_m$ segments and there is no jump in offset at receiver 308. Substituting $\Delta_{pj}$ for $r_{c1}$ in (6) and setting $\beta_o$ to zero, obtains:

$$\delta_i = \gamma_j \Delta_{pj}. \tag{7}$$

The variable $\Delta_{pj}$ differs from $r_{c1}$ because it returns to zero after transmission of the last TCP segment of each batch of $n_m$ TCP segments, as shown in FIG. 7, giving transmitter 302 the ability to induce separate clock skew values on each $n_m$ TCP segments. The altered timestamp now has an added offset $\delta_i$ component. The timestamps at receiver 308 and transmitter 302, respectively, are given by:

$$t_{c1} = t_{c1o} + r_{c1i} + \delta_i$$

$$t_{c2} = t_{c2o} + r_{c2i}. \quad (8)$$

FIG. 8 illustrates a functional diagram 800 of message extraction in accordance with one embodiment of the invention. The message extraction process recovers the embedded message 316. The timestamp pairs provided by the TCP timestamp and receiver timestamp are used to calculate drift which is the difference in offset between the transmitter 302 CPU clock and the receiver 308 CPU clock. Batches of $n_m$ drift values are then used to estimate the induced clock skew. The estimated clock skew then goes through A/D conversion and is mapped to a predetermined symbol. The predetermined symbols are then converted back to bits, and message 316 is recovered. After using the first $n_b$ segments to calculate an estimate for baseline skew $\hat{\alpha}_b$ using equation (6), receiver 308 subtracts $\hat{\alpha}_b$ from the estimated clock skew in each group of $n_m$ segments to estimate induced clock skew value $\hat{\gamma}_j$ where $\hat{\gamma}_j$ is given by $\hat{\gamma}_j = \hat{\alpha}_j - \hat{\alpha}_b$. The induced clock skew value $\hat{\gamma}_j$ is then compared against a threshold value to determine which symbol it is mapped to for A/D conversion. For example, for q=1, the threshold values are 0.5$\zeta$, and −0.5$\zeta$ which means that values of $\hat{\gamma}_j$ greater than 0.5$\zeta$ are mapped to $\rho_1$, values of $\hat{\gamma}_j$ less than −0.5$\zeta$ are mapped to $\rho_0$, and values of $\hat{\gamma}_j$ that fall between −0.5$\zeta$ and 0.5$\zeta$ correspond to 'no signal detected'. Receiver 308 then maps the symbols back to bits to recover message 316.

For q>1, the A/D conversion process requires the creation of bins to map each of the induced skew estimates to a symbol. This mapping is given by $$\rho_j = \begin{cases} \frac{Q}{2} & \text{for } \hat{\gamma}_j > \left(\frac{Q+1}{2}\right)\zeta \\ 1 & \text{for } 0 \geq \hat{\gamma}_j > 1.5\zeta \\ k & \text{for } \left(\frac{2k-1}{2}\right)\zeta < \hat{\gamma}_j < \left(\frac{2k+1}{2}\right)\zeta, k = \pm 2, \ldots \pm\left(\frac{Q}{2}-1\right) \\ -1 & \text{for } 0 < \hat{\gamma}_j \leq -1.5\zeta \\ \frac{-Q}{2} & \text{for } \hat{\gamma}_j < \left(-\frac{Q+1}{2}\right)\zeta \end{cases} \quad (9)$$

Figure 9:
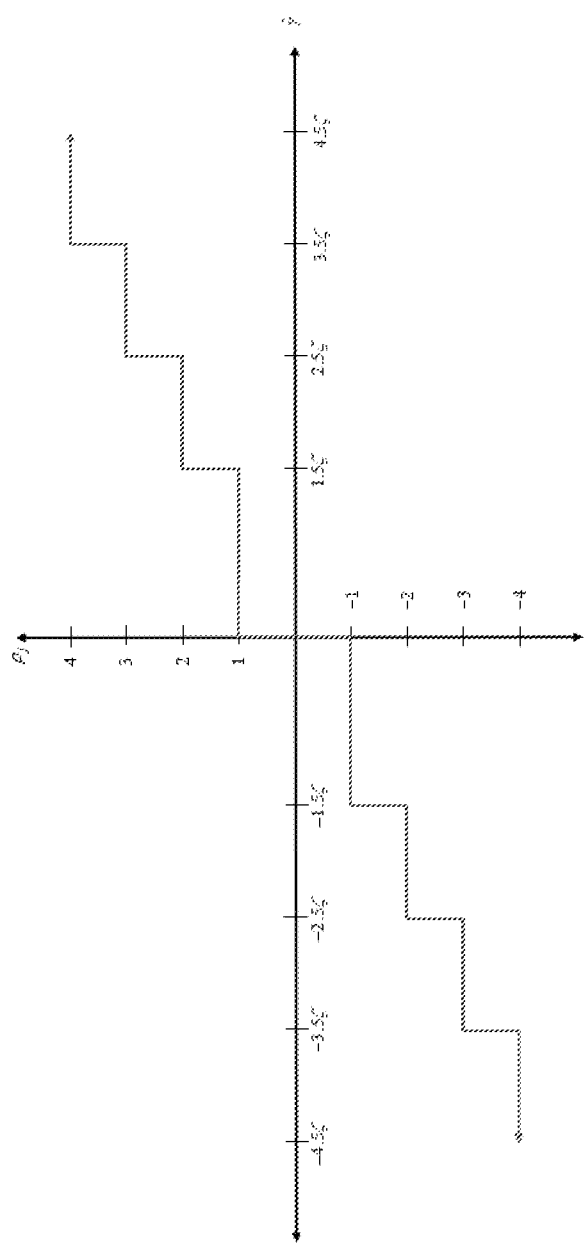
FIG. 9 illustrates a transfer characteristic of an A/D convert block for q=3 for in accordance with one embodiment of the invention.

FIG. 9 illustrates the transfer characteristic for q=3 according to equation (9).

After mapping the clock skew estimates to corresponding symbols, the symbols are mapped to bits according to a table shared by transmitter 302 and receiver 308, e.g., Table 1 is used for this mapping process by both transmitter 302 and receiver 308 for q=4. For mapping the symbols back to bits for q>1, a gray code can be used to ensure that a clock skew estimate that crosses a single threshold incorrectly only produces a single bit error when the symbols are mapped back to bits. Use of gray code does not help reduce bit errors for symbol errors resulting from the erroneous crossing of more than one threshold, which can result in up to q bit errors for each symbol error.

Figure 10A:
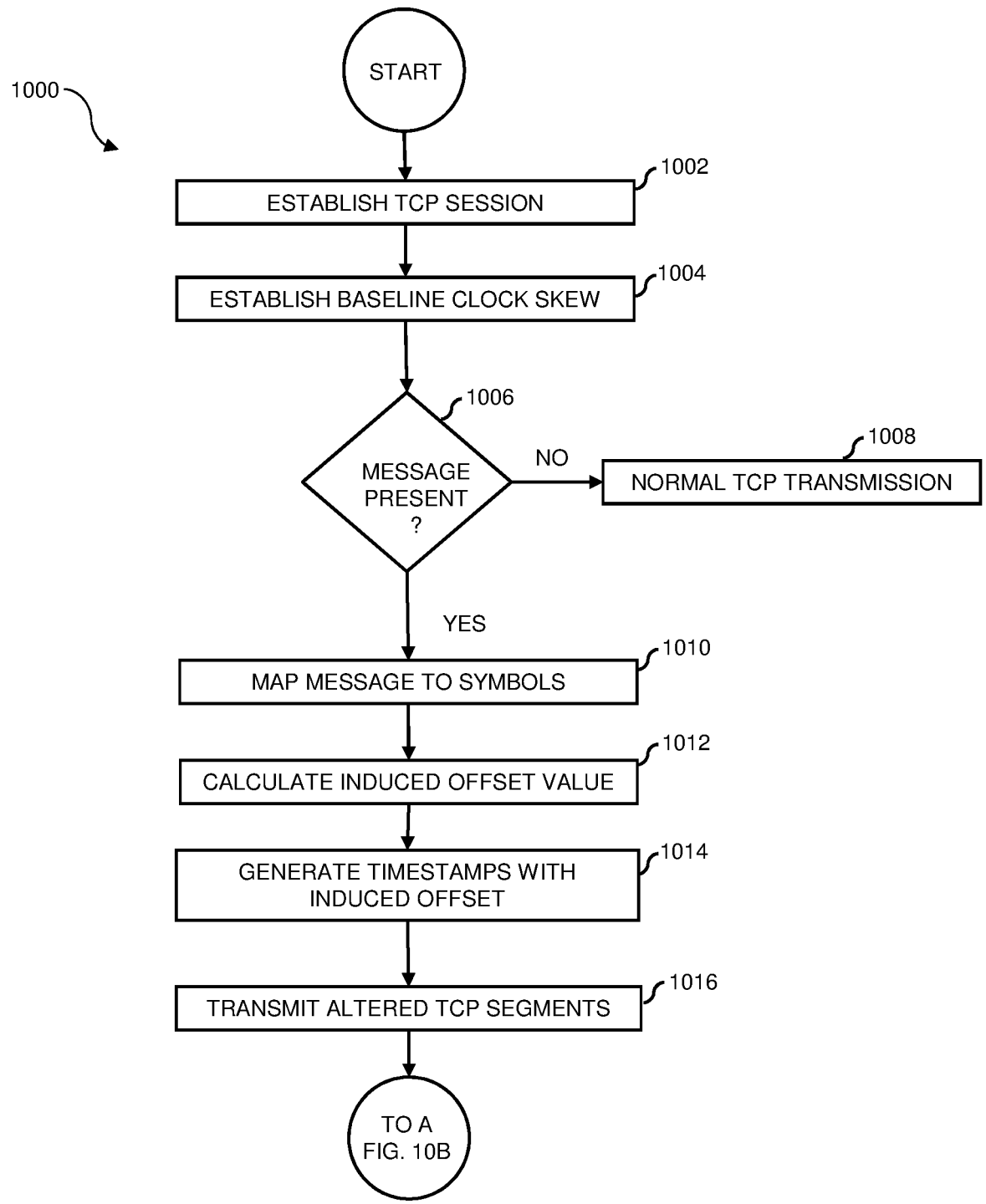
FIG. 10A and FIG. 10B, illustrates a process flow diagram of a method for clock-skew-based covert communication in accordance with one embodiment of the invention.
Figure 10B:
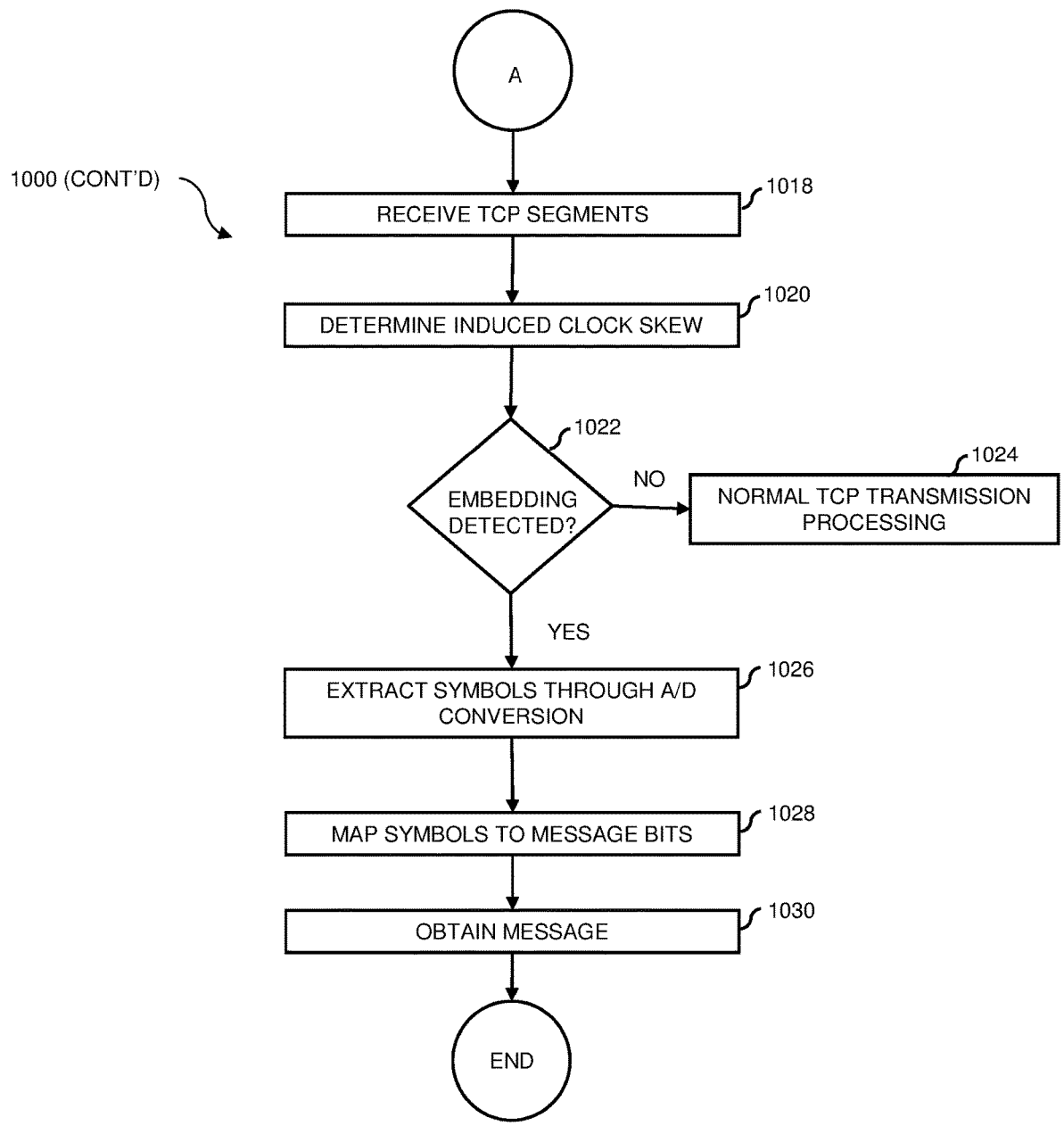

FIGS. 10A and 10B together illustrate a process flow diagram of a method 1000 for clock-skew-based covert communication in accordance with one embodiment of the invention. FIG. 10A illustrates a process flow diagram of the transmitter implemented portion of method 1000 in accordance with one embodiment of the invention. FIG. 10B illustrates a process flow diagram of the receiver implemented portion of method 1000 in accordance with one embodiment of the invention.

Referring initially to FIG. 10A, in operation 1002 (ESTABLISH TCP SESSION), transmitter 302 initiates a TCP session connection with the timestamp option enabled.

In operation 1004 (ESTABLISH BASELINE CLOCK SKEW), transmitter 302 initially transmits over network 314 a predetermined quantity of unaltered TCP segments sufficient for receiver 308 to calculate a baseline clock skew of transmitter 302 from the timestamps of the received TCP segment timestamps.

In decision operation 1006 (MESSAGE PRESENT?), a determination is made whether a message was input for covert transmission to receiver 308. When a message is not received ("NO"), processing continues to operation 1008 (NORMAL TCP TRANSMISSION) in which normal TCP transmission continues. Alternatively, when a message, for example, message 316, has been input ("YES"), processing continues to operation 1010 in which message 316 is further processed by embedding module 306.

In operation 1010 (MAP MESSAGE TO SYMBOLS) message 316 information represented as bits in the TCP message block is mapped to symbols, each symbol having a predetermined meaning and a predetermined clock skew value.

In operation 1012 (CALCULATE INDUCED OFFSET VALUE), the induced offset that is to be added to each TCP segment timestamp in a batch of TCP segments to produce the clock skew value is calculated.

In operation 1014 (GENERATE TIMESTAMPS WITH INDUCED OFFSET), the calculated offset value determined in operation 1012 is added to the timestamp of each outgoing TCP segment in the batch, generating altered TCP segments.

In operation 1016 (TRANSMIT ALTERED TCP SEGMENTS), each altered TCP segment in the batch is transmitted to the receiver. In this way message 316 in covert form, is transmitted to receiver 308.

Referring now to FIG. 10B, in operation 1018 (RECEIVE TCP SEGMENTS), receiver 308 receives the TCP segments.

In operation 1020 (DETERMINE INDUCED CLOCK SKEW), receiver 308 determines the induced clock skew present in the timestamp. The baseline clock skew earlier established in operation 1004 (FIG. 10A) is subtracted from the timestamps of the TCP segments in each batch to determine the induced clock skew from the TCP segments.

In decision operation 1022 (EMBEDDING DETECTED?), based on the induced clock skew calculation of operation 1020, a determination is made whether message embedding is detected. For example, if the induced clock skew calculation results in a value that is not within a threshold range of the predetermined induced clock skew values used to represent the symbol set, a determination is made that embedding is not detected ("NO"), and processing continues to operation 1024 (NORMAL TCP TRANSMISSION PROCESSING) with normal TCP transmission processing of the TCP segments. Alternatively, if the induced clock skew calculation results in a value that is within a threshold range of the predetermined induced clock skew values used to represent the symbol set, a determination is made embedding is detected ("YES"), with processing continuing to operation 1026.

In operation 1026 (EXTRACT SYMBOLS THROUGH A/D CONVERSION), the induced clock skew value is mapped to a corresponding symbol by A/D conversion where the analog received induced clock skew value is mapped to a corresponding discrete symbol.

In operation 1028 (MAP SYMBOLS TO MESSAGE BITS), the symbols are then mapped to associated message bits which represent the message information in the original TCP message block.

In operation 1030 (OBTAIN MESSAGE), the original message, for example, message 316, is obtained based on the message bits.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A system for clock-skew-based covert communication utilizing the Transfer Control Protocol (TCP) comprising:
   a transmitter, the transmitter comprising:
      a central processing unit (CPU) having a CPU clock which generates a timestamp for outgoing TCP segments, and
      an embedding module;
   a receiver, the receiver comprising:
      a central processing unit (CPU) having a CPU clock which generates a timestamp for incoming TCP segments, and
      an extractor module; and
   a network communicatively coupling the transmitter and the receiver;
   wherein the embedding module:
   obtains a message to be sent, the message including message bits;
   maps the message bits to a corresponding symbol, the symbol having an associated clock skew value;
   calculates an offset value to be added to each timestamp in a predetermined quantity of TCP segments to result in the associated clock skew value for the symbol;
   adds the calculated offset value to each timestamp in the predetermined quantity of TCP segments to generate a predetermined quantity of altered TCP segments; and
   transmits the predetermined quantity of altered TCP segments to the network; and,
   wherein the extractor module:
   receives the predetermined quantity of altered TCP segments;
   determines the clock skew value from the timestamps of the predetermined quantity of altered TCP segments;
   determines the symbol that corresponds to the clock skew value based on predetermined threshold levels;
   extracts the symbol through analog to digital conversion (A/D);
   maps the symbol to the corresponding message bits; and,
   obtains the message from the message bits.

2. A method for clock-skew-based covert communication utilizing the Transfer Control Protocol (TCP) comprising:
   establishing a TCP session between a transmitter and a receiver over a communication network;
   establishing a baseline clock skew of the transmitter by the receiver;
   obtaining a message to be sent by the transmitter, the message including message bits;
   mapping the message bits to a corresponding symbol, the symbol having an associated clock skew value;
   calculating an offset value to be added to each timestamp in a predetermined quantity of TCP segments to result in the associated clock skew value for the symbol;
   adding the calculated offset value to each timestamp in the predetermined quantity of TCP segments to generate a predetermined quantity of altered TCP segments;
   transmitting the predetermined quantity of altered TCP segments over the communication network to the receiver;
   receiving the predetermined quantity of altered TCP segments at the receiver;
   determining the associated clock skew value from the timestamps of the predetermined quantity of altered TCP segments;
   determining the corresponding symbol for the clock skew based on predetermined threshold levels;
   extracting the symbol through analog to digital conversion (A/D);
   mapping the symbol to corresponding message bits; and,
   obtaining the message from the message bits.

3. A method for embedding a clock-skew-based covert communication at a transmitter utilizing the Transfer Control Protocol (TCP) comprising:
   obtaining a message to be sent by the transmitter, the message including message bits;
   mapping the message bits to a corresponding symbol, the symbol having an associated clock skew value;
   calculating an offset value to be added to each timestamp in a predetermined quantity of TCP segments to result in the associated clock skew value for the symbol;
   adding the calculated offset value to each timestamp in the predetermined quantity of TCP segments to generate a predetermined quantity of altered TCP segments;
   transmitting the predetermined quantity of altered TCP segments.

4. A method for extracting a clock-skew-based covert communication utilizing the Transfer Control Protocol (TCP) comprising:
   receiving a predetermined quantity of altered TCP segments, the altered TCP segments having an offset value added to each timestamp in the predetermined quantity of altered TCP segments;
   determining a clock skew value from the timestamps of the predetermined quantity of altered TCP segments;
   determining a symbol that corresponds to the clock skew value based on predetermined threshold levels;
   extracting the symbol through analog to digital conversion (A/D);
   mapping the symbol to associated message bits; and,
   obtaining the message from the message bits.

* * * * *